April 19, 1938.   C. H. OLDS   2,114,475

HAWK AND OWL TRAP

Filed Oct. 28, 1936

INVENTOR

Charles H. Olds

By Ralph Burch

Attorney

Patented Apr. 19, 1938

2,114,475

UNITED STATES PATENT OFFICE 2,114,475

HAWK AND OWL TRAP

Charles Herbert Olds, Prince George, British Columbia, Canada

Application October 28, 1936, Serial No. 108,104
In Canada August 17, 1936

1 Claim. (Cl. 43—93)

This invention relates to improvements in a hawk and owl trap. Its primary object is to provide a trap of sufficient size and strength to capture and kill permanently large size birds.

A further object of the invention is to provide a trap, operated from a perch upon which the birds alight.

A still further object is to provide such a trap that will be efficient and durable and inexpensive to manufacture.

With these and other objects in view that may appear while the description proceeds the invention consists in the novel construction and arrangement of parts as hereinafter more specifically set forth, claimed and shown in the accompanying drawing forming part of this specification and in which:

Figure 1:
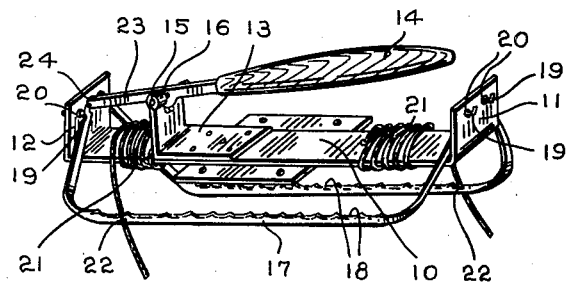
Fig. 1 is a perspective view of my improved hawk and owl trap the same being in the set position.
Figure 2:
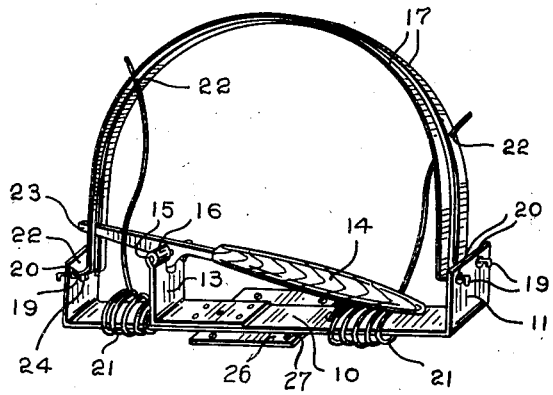
Fig. 2 is a similar view showing the trap sprung.
Figure 3:
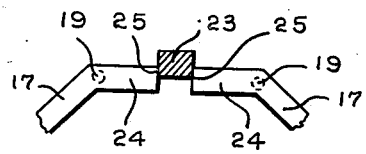
Fig. 3 shows a detail view of the trigger arrangement of the said trap.

Referring more in detail to the drawing in which similar reference characters designate corresponding parts throughout the several views it will be seen the invention comprises an elongated base 10, having its two ends 11 and 12 angularly disposed thereto. An angle bracket 13 is secured to the said base near the end 12 and forms a pivot support for the perch or trigger 14 which is pivotally mounted thereon, a pivot pin 15 being inserted through the upper end of the bracket 13 which is formed into a loop 16 for that purpose. The C shaped jaws 17 are provided with serrated edges 18 and have their outer extremities 19 turned outward to form the pivots for the same. The said pivots are rotatably mounted in orifices 20 in the base ends 11 and 12. The springs 21 are secured to the base 10 and are looped around the same. The outer ends of the springs are extended to engage orifices 22 in the jaws 17. The springs are arranged so that the tension thereof normally tends to close the jaws and are of suitable size and strength to hold the bird securely between the jaws when caught. The trigger arrangement consists of an extension 23 of the pivoted perch or trigger 14 which is of square cross-section, projections 24 are provided on the pivotal portions 19 of the jaws 17. The said projections engage the said square section of the trigger 23, when the trap is in the set position as clearly shown in Fig. 3.

It will be seen from the foregoing that in order to set the trap the jaws 17 are opened and the trigger extension 23 placed between the projections 24 and engaged thereby. The action of the springs 21 on the jaws 17 give the said projections sufficient grip on the trigger extension to hold the same with the perch 14 in a raised position. When a bird alights on the perch, its weight presses down on the same and causes the trigger extension to rise from its position between the projections 24 which releases the jaws permitting them to swing closed upon the bird.

Provision is made to securely fasten the trap to a tree top, stump, or other suitable location and comprises a plate 26 riveted or otherwise secured to the base 10 and provided with orifices 27 to receive screw nails or wire to hold the plate in place.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating elements may be resorted to within the scope of what is claimed without departing from the spirit of the invention.

I claim:—

In a trap of the type set forth, an elongated base having its ends upwardly turned, an angle bracket mounted thereon having a loop in its upper end, a perch pivotally mounted on a pivot pin in the said loop, two C shaped jaws pivotally mounted in the upturned ends of the base, spring means operating on the said jaws to normally bring them together in an upright position, projections on the pivotal portions of the jaws, and an extension on said perch adapted to engage the said projections in a manner to hold the jaws apart against the spring tension until disengaged therefrom by a downward movement of the perch.

CHARLES HERBERT OLDS.